United States Patent

[11] 3,571,629

[72] Inventor Dan Hilberman
New Shrewsbury, N.J.
[21] Appl. No. 751,829
[22] Filed Aug. 12, 1968
[45] Patented Mar. 23, 1971
[73] Assignee Bell Telephone Laboratories, Incorporated
Murray Hill, Berkeley Heights, NJ,

[54] FREQUENCY-SHAPING NETWORK USING CONTROLLED SOURCES
12 Claims, 7 Drawing Figs.

[52] U.S. Cl. .......... 307/295,
307/229, 307/233, 328/127, 328/165
[51] Int. Cl. .......... H03b 1/04
[50] Field of Search .......... 328/165,
167, 127; 307/229, 230, 233, 295

[56] References Cited
UNITED STATES PATENTS
3,122,714 2/1964 Morris .......... 307/230X

*Primary Examiner*—Stanley T. Krawczewicz
*Attorneys*—R. J. Guenther and E. W. Adams, Jr.

ABSTRACT: A frequency-shaping network is disclosed which combines voltage-controlled voltage sources and current-controlled current sources to provide a voltage integrator. By combining the controlled sources to form an integrator, advantageous use may be made of this integrator in a frequency-shaping network in order to provide a transfer function which is relatively insensitive to the gain of the amplifiers used in the controlled sources. Further, the transfer function coefficients may be relatively independently and easily determined by merely choosing desired impedance values.

PRIOR ART FIG. 1
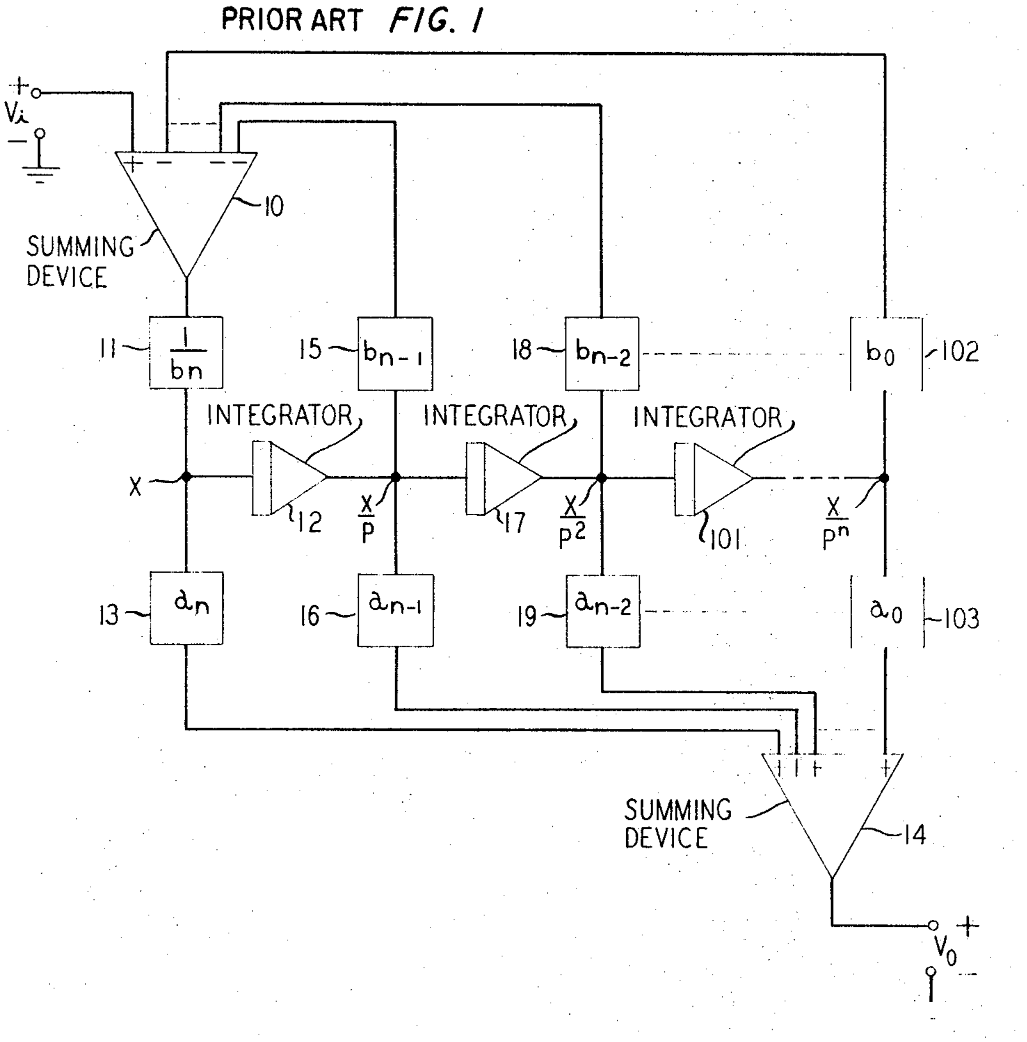
PRIOR ART FIG. 2
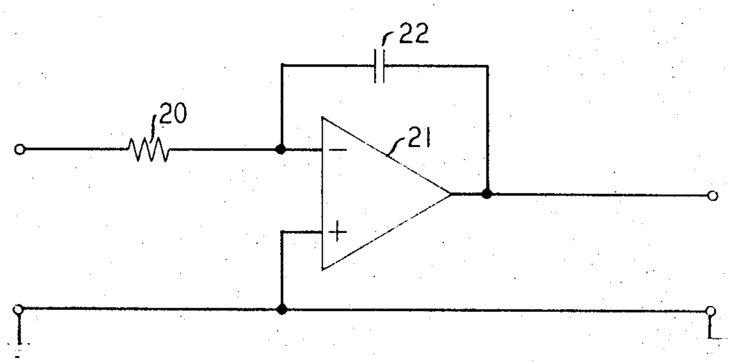
INVENTOR
D. HILBERMAN
BY Peter L Berger
ATTORNEY

FREQUENCY-SHAPING NETWORK USING CONTROLLED SOURCES

BACKGROUND OF THE INVENTION

This invention relates to frequency-shaping networks and, more particularly, to frequency-shaping networks using active devices.

Traditionally, frequency-shaping networks have included frequency-sensitive elements such as capacitors and inductors. Recently though, a new body of technology has developed in which circuit arrangements are being designed to provide frequency shaping without the need for inductors. There are many advantages realized by the elimination of inductors from networks. For example in circuit applications, inductors may create problems because of their associated magnetic fields and their nonlinear behavior. In network synthesis procedures, the winding resistance, parasitic capacitance, and coil loss of the inductor element complicates the network design, while in other applications, the size and weight of inductors make them undesirable. Further, it is presently virtually impossible to realize practical inductors in integrated circuits. For these reasons and many others it is desirable to eliminate inductors from network realizations but still retain the frequency-shaping capabilities provided by the inductor element. One technique for accomplishing this result is the use of active RC circuits.

A comprehensive review of the state of the art in active RC circuits is provided by L. P. Huelsman in his book entitled "Theory and Design or Active RC Circuits" published in 1968 by McGraw-Hill Book Company. Huelsman breaks down the design approaches to inductor simulation utilizing active RC circuits to essentially four classes. These four overlap but may be considered to be controlled source realization, negative-immittance-converter realization, gyrator realization, and infinite gain realization of the inductor performance. These four realizations or approaches suffer from similar problems, and may be more easily understood by referring to a generalized transfer function for a frequency-shaping network which may be realized by any of the above four approaches. In general, the transfer function for a second-degree frequency-shaping network may be considered to be $$H(s)=\frac{As^2+Ds+F}{Bs^2+Es+G} \qquad (1)$$

The performance of the frequency-shaping network is approximately inversely proportional to coefficient $E$. In order to realize this transfer function and achieve as low a value for coefficient $E$ as possible and therefore as high a frequency selectivity as possible, cancellation between relatively equally valued quantities or the availability of an infinite gain amplifier is required. These requirements are usually significantly more dependent upon the gains of the active devices than any other element utilized in the network realizations. Since the gains of the active devices are dependent upon parameters which are not always easily controlled, it is often difficult to maintain the value of coefficient $E$ very low. In addition, the percentage change in the value of coefficient $E$ may be significant as the gains vary.

A classical method of obtaining a frequency-selective network is to cascade electronic networks which provide integration and use negative feedback therebetween. In the prior art, these electronic circuits generally include an infinite gain device, commonly an operational amplifier, as an essential element. In reality, an operational amplifier does not provide infinite gain but, in engineering terms, is referred to as an infinite gain device. For the purposes of this application, finite gain devices will be those in which extremely high gains are unnecessary. The transfer function which results from this type of a frequency-selective network suffers from the same problems as the frequency-selective networks described above in that infinite gain or cancellation is required in order to realize a transfer characteristic having relatively good selectivity.

In a paper by D. Hilberman and R. D. Joseph entitled "Immittance Matrix Synthesis with Active Networks" appearing in the IEEE Transactions on Circuit Theory, Vol. CT-13, No. 3, page 324, Sept. 1966, an integrator comprising controlled sources with unity gain active devices is disclosed, but there is no suggestion in that publication to use the disclosed integrator in the classical frequency-selective network describe above. Controlled sources, as disclosed in the book by L. P. Huelsman, are commonly used in active RC circuit realizations and an entire chapter to their use and application in frequency-selective networks may be found, beginning at page 63 in that book.

Frequency-selective networks in the prior art generally suffer from another major problem. In the above transfer function equation, when it relates to the above-mentioned frequency-selective network, the individual coefficients are independent of each other only when infinite gain active devices are used. It would be desirable to utilize relatively low-gain devices to achieve this same independence.

The prior art frequency-selective networks which depend upon the gain of the active devices to realize a desired transfer function are limited to relatively low frequency application because as more gain is required in the active device, the bandwidth that can be accommodated by that device correspondingly decreases. In addition, where high gain in an active device is required, the stability of the circuit in which it is used is lessened.

An object of the present invention is to provide an active frequency-shaping network including active devices where the transfer function of the network is not more sensitive to the gains of the active devices than it is to the values of the other elements in the network.

Another object of the present invention is to provide an active frequency-shaping network where the above-mentioned coefficient $E$ is relatively insensitive to changes in the gains of the active devices.

Another object of the present invention is to provide an active frequency-shaping network including active devices where the gains of the active devices may be relatively low.

Another object of the present invention is to provide an active frequency-shaping network in which the coefficients of its transfer function are relatively independently controlled while the gain of the active devices may be relatively low.

SUMMARY OF THE INVENTION

These objects are accomplished in accordance with the principles of the present invention by utilizing controlled sources connected to perform approximate integration functions, cascading each integrator formed this way and providing negative feedback between the cascaded integration stages. The results obtained in a frequency-shaping network arranged according to the principles of the present invention provide significant and unexpected improvements over the prior art. Cascading integrators and providing negative feedback commonly provides the above-mentioned problems. The significant benefits arising from utilizing a controlled source integrator as the cascaded element are totally unexpected. In particular, the transfer function of the frequency-selective network so provided is as sensitive to the gains of the active devices as to other elements in the network, enables the coefficient in the transfer function describing its performance to be relatively independently controlled while utilizing low-gain active devices, permits the use of low-gain active circuits, and does not rely upon cancellation or infinite gain which, as described above, provides relatively inaccurate performance.

Use of the controlled sources to form each integration stage enables the resulting frequency-selective network to take advantage of their significant benefits. Included among these is the ability to absorb unwanted impedance effects at the input and output of the controlled source.

One illustrative embodiment of the present invention uses elements which may be fabricated by integrated circuitry techniques. Thus, only resistors, capacitors, and transistors may be utilized to derive the basic integrating building block used in accordance with the present invention. It is to be understood, of course, that the basic integrating function with controlled sources can be accomplished by using inductor elements and, when in the future, these may be advantageously fabricated, they may be used in an integrating stage. In the illustrative embodiment herein presented, the integrator stage is formed by connecting a capacitor to signal ground from the output of a current-controlled current source. This integrator is used in conjunction with a voltage-controlled voltage source and resistors to form a current transfer network which preforms an approximate integration function with a voltage input and output. The desired transfer function may be realized by cascading two of the above integration stages an providing negative feedback between them and positive feed forward to derive an output signal.

In accordance with another feature of the present invention, active devices utilizing amplifiers having less than unity gain may be used to form the desired integration stages. A frequency-selective network constructed in accordance with the present invention may be used over a wider bandwidth than that obtainable in the prior art since high gain in the prior art active device was required.

BRIEF DESCRIPTION OF THE DRAWINGS

FIG. 1 is a block diagram illustrating a generalized form for a classical frequency-shaping network comprising cascaded integrators with negative feedback;

FIG. 2 is a schematic diagram of the prior art integrator used with the frequency-shaping network shown in FIG. 1;

DETAILED DESCRIPTION

Figure 3:
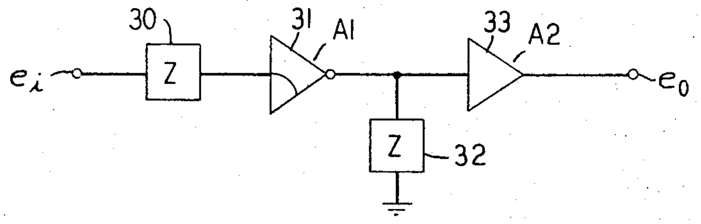
FIG. 3 is a block diagram illustrating an integrator using controlled sources.

Network synthesis utilizing active RC circuits uses the four approaches set forth above, Each of these approaches, as set forth in the prior art and shown in the book by L. P. Huelsman, suffers from significant disadvantages. The approaches are summarized in that book, and only one of the approaches, that shown in FIG. 1, will be presented since it is the most relevant prior art to be considered in relation to the principles of the present invention.

FIG. 1 is a block diagram of a generalized frequency-shaping network utilizing cascaded integrators with negative feedback. Input voltage $V_i$ is applied to one input of multiinput summation device 10. Any well-known prior art summing device may be utilized and, for instance, one common summing device that may be used includes an operation amplifier with resistive feedback and having its inputs supplied through resistive elements. The generalized open circuit transfer function which describes the operation of the frequency-shaping network of FIG. 1 is $$H(s)=\frac{a_0+a_1s+a_2s^2+\ .\ .\ .\ +a_ns^n}{b_0+b_1s+b_2s^2+\ .\ .\ .\ +b_ns^n} \qquad (2)$$

The output of summing device 10 is connected to one side of impedance element 11 which determines one of the coefficients of the above transfer function. The coefficient determined by impedance element 11 is $b_n$ where $b_n$ is the last coefficient in the denominator of the transfer function shown in equation (2). The other side of impedance element 11 is connected to the input of integrator 12 and through an impedance element 13 to summing device 14 which is similar to summing device 10. A detailed description of integrator 12 will be set forth below. Impedance element 13 determined one of the coefficients in the transfer function and, in particular, determines coefficient $a_n$ in the numerator. The output of the frequency-shaping network shown in FIG. 1 is provided at the output of summing device 14.

The output of integrator 12 passes through impedance element 15 to the input of summing device 10. The input of summing device 10 is labeled with a negative sign, indicating a negative feedback path between the output and input of integrator 12. Impedance element 15 determines coefficient $b_{n-1}$ in the transfer function in the same manner as impedance element 11 determines coefficient $b_n$. The output of integrator 12 also passes through impedance determining element 16 to a positive input of summing device 14. The output of summing device 14 is determined by the positive sum of all the signals applied to its input. Therefor no signal inversion is required through summation device 14. Impedance device 16 determines another coefficient in the transfer function in the same manner as does impedance device 13. The output of integrator 12 also passes through integrator 17, the output of which passes through another series of coefficient determining impedances 18 and 19 and integrator 101. In this manner, a series of $n$ integrators are cascaded with negative feedback and positive feed forward through coefficient determining impedances 11, 15, 18 and 102 and 13. 16, 19 and 103, respectively.

The operation of the network shown in FIG. 1 may be more easily understood by considering the input to integrator 12 as a signal designated $x$. It is integrated by integrator 12 and shown at the output of integrator 12 as $x/p$. After the original signal appearing at the input to integrator 12 has passed through $n$ stages of integration, a signal represented as $x/p^n$ is generated at a point shown in FIG. 1.

FIG. 1 illustrates a generalized waveshaping network comprising a cascaded series of integrators having negative feedback and positive feed forward. Prior art integrators that have been utilized in the block diagram of FIG. 1 result in transfer functions and network synthesis which requires the aforementioned infinite gain to achieve a desirable transfer function.

Illustrative of commonly used integrator is that shown in FIG. 2, which is a schematic diagram of a prior art integrator. Integration is achieved by utilizing an operational amplifier operated as a high-gain device in conjunction with waveshaping elements. The input signal is applied through resistor 20 to negative input of two-input operational amplifier 21. Capacitor 22 is connected between the output of operational amplifier 21 and its negative input. The second input of two-input operational amplifier 21 may be connected to a point of reference potential. The operation of this integrator is well known. When this integrator is utilized in the block diagram of FIG. 1 for two stages of integration with negative feedback and positive feed forward, a transfer function results having the following form:

$$H(s)=\frac{As^2+Ds+F}{Bs^2+Es+G} \qquad (3)$$

The $E$ coefficient for finite gain may be shown to be:

$$\frac{K_1A_1}{1+A_1}+\frac{K_2}{1+A_1}+\frac{K_3}{1+A_2} \qquad (4)$$

where $A_1$ is the gain of the operational amplifier in the first integrator and $A_2$ is the gain of the operational amplifier in the second integrator. It may be shown that a measure of the selectivity of the network is its ability to realize a small value for this coefficient $E$. It would be desirable that this coefficient be made least sensitive to that parameter which may most likely vary. In engineering terms, the parameter which will most probably vary will be the gain of the active device, that is, the gain of the operational amplifier since it is dependent upon such environmental factors as temperature, aging, power supply variation and other commonly accepted factors which cause the gain to vary. But the sensitivity coefficient $E$ derived by utilizing the differential amplifier shown in FIG. 2 in the waveshaping network of FIG. 1 may, in fact, be shown to be dependent upon this gain. The sensitivity may be defined as the percentage change in $E$ divided by the percentage change in the variable parameter. It may further be shown that the sensitivity of this coefficient increases as the gain of the device decreases. In addition, it may be shown that the sensitivity increases as this coefficient decreases in value. Both of these conditions are clearly undesirable.

FIG. 3 is a block diagram of an integrator formed by using controlled sources. An input voltage $e_i$ is connected through a series connection of impedance 30 and current-controlled current source 31 to ground. A current-controlled current source is well known in the prior art and further details may be found in chapter 3 of the book by Huelsman. Briefly, though, a current-controlled current source may be considered to have a zero input impedance and produce an output current which is proportional to the input current. The constant of proportionality is illustratively shown to be $A_1$ for current-controlled current source 31.

The current output of current-controlled current source 31 is applied through impedance 32 to ground and to the input of voltage-controlled voltage source 33 which produces an output voltage which is proportional to its input voltage. The constant of proportionality for voltage-controlled voltage source 33 may be considered to be $A_2$. A voltage-controlled voltage source is also described in chapter 3 of the book by Huelsman and, briefly, may be considered to be a device which has an infinite input impedance. Therefore, the current developed at the output of current-controlled current source 31 which passes through impedance 32 does not pass through voltage-controlled voltage source 33. By choosing impedances 30 and 32, desired waveshaping may be obtained.

Figure 4:
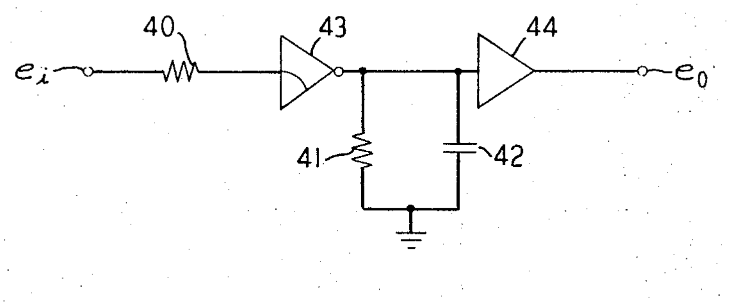
FIG. 4 is a more detailed schematic diagram of an integrator using controlled sources.

FIG. 4 illustrates an integrator formed by utilizing controlled sources where impedance 30 of FIG. 3 is chosen to be resistor 40 and impedance 32 of FIG. 3 is chosen to be parallel combination of capacitor 42 and resistor 41. The parallel combination of capacitor 42 and resistor 41 provides a desired lossy integration operation. Lossy integration rather than pure integration has significant engineering advantages which are well known to one skilled in the art. Pure integration, though, may be achieved by having resistor 41 become infinite. An input voltage is applied through a series combination of resistor 40 and current-controlled current source 43. The output of current-controlled current source 43 is applied to the input of voltage-controlled voltage source 44 and through the parallel combination of resistor 41 and capacitor 42 to ground. The output of the integrator is derived at the output of voltage-controlled voltage source 44.

The integration operation is obtained by current-controlled current source 43, resistor 41 and capacitor 42 while resistor 40 serves to convert the input voltage to a current which is applied to current-controlled current source 43. Voltage-controlled voltage source 44 is utilized as a buffer so that the lossy integrating properties of resistor 41 and capacitor 42 are unaffected by succeeding circuitry. In the above article by R. D. Joseph and D. Hilberman it was disclosed that controlled sources may be utilized to form integrators, but that publication failed to suggest the use of such integrators in the generalized frequency-shaping network of FIG. 1 or other prior art frequency-shaping networks.

Figure 5:
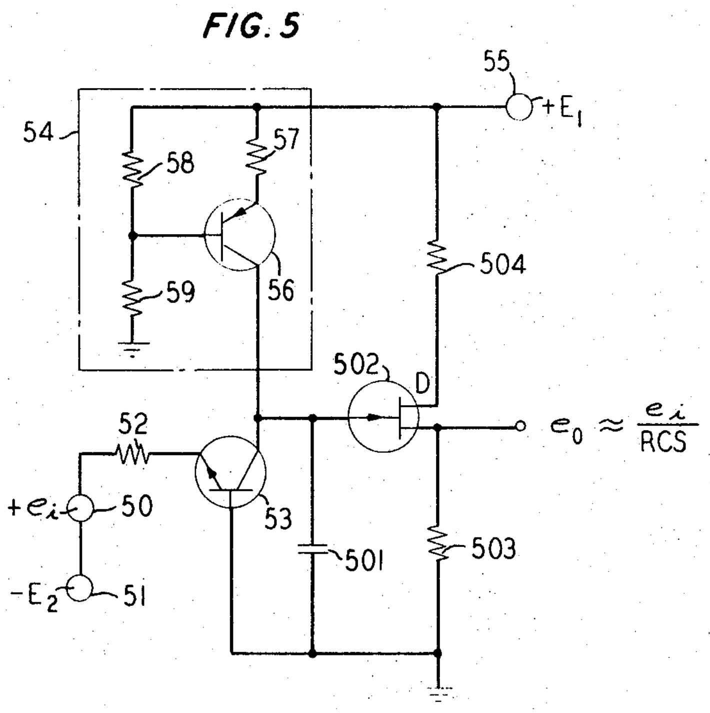
FIG. 5 is an even more detailed schematic diagram of an integrator using controlled sources which may be utilized in accordance with the teachings of the present invention.

FIG. 5 presents a more detailed schematic diagram of an integrator formed by using controlled sources. The input voltage $e_i$ is supplied at source 50, the negative end of which is connected to a negative source of potential 51. The positive terminal of input source 50 is applied through resistor 52 to the emitter of NPN transistor 53. The base of NPN transistor 53 is connected to ground while the collector is supplied by a current produced by current source 54.

Current source 54 converts a source of potential 55, illustratively shown to be positive, to a current which is supplied to the collector of NPN transistor 53. Positive potential source 55 is supplied to the emitter of PNP transistor 56 through resistor 57 and to the base of PNP transistor 56 through resistor 58. Resistor 59 is connected from the base of transistor 56 to ground and with resistor 58 forms a voltage divider which maintains PNP transistor 56 in a conducting stage so as to provide current through the collector terminal of PNP transistor 56 to the collector terminal of NPN transistor 53. Current source 54 may be considered to have an infinite impedance as seen by the collector of transistor 53 and thus, pure integration is provided since the resistor component 41 of FIG. 4 may be considered to be infinity. Capacitor 501 is connected from the collector of transistor 53 to ground. The integration action described with reference to FIG. 4 is accomplished with the circuitry described so far in FIG. 5 with current supply 54 and NPN transistor 53 serving as the current-controlled current source and capacitor 501 serving as an integrating element. The voltage-controlled voltage source which provides the necessary buffering comprises field effect transistor 502 and resistors 503 and 504. The gate of field effect transistor 502 is connected to the collector of NPN transistor 53, while the drain of field effect transistor 502 is connected through resistor 504 to a positive source of potential 55, and the source of field effect transistor 502 is connected to ground through current-limiting resistor 503. The output of this buffering stage is derived at the source of field effect transistor 502 (and across resistor 503). FIG. 5 may be considered as an illustrative building block for an integration stage comprising controlled sources. Other configurations and arrangements may be suggested by those skilled in the art.

The transfer function for prior art frequency-shaping networks suffers from the problems described above. The generalized frequency-shaping network shown in FIG. 1 when utilized with the integrators of the prior art which have been used with it suffers from similar problems, as above enumerated. In the prior art, there has been no suggestion or any showing of a circuit configuration for frequency-shaping which would obviate the problems attendant the prior art configurations. When the integrator comprising controlled sources is utilized in the block diagram of FIG. 1, significant and unexpected results are obtained. These results provide substantial improvement over prior art frequency-shaping networks. In particular, neither cancellation nor infinite gain is required in order to realize small values for coefficient $E$ in the transfer function shown as equation (1). In addition the sensitivity of the transfer function is independent of the gain of the individual devices in the controlled source. Further, the coefficients in the transfer function describing the operation of the frequency-shaping network utilizing controlled sources may be independently controlled while using low-gain active devices. Consequently, with this individual control and low gain for the active devices, resonant frequencies may be changed without changing bandwidth. Other benefits are derived by utilizing the integrator comprising controlled sources in a frequency-shaping network as suggested by the principles of the present invention.

Figure 6:
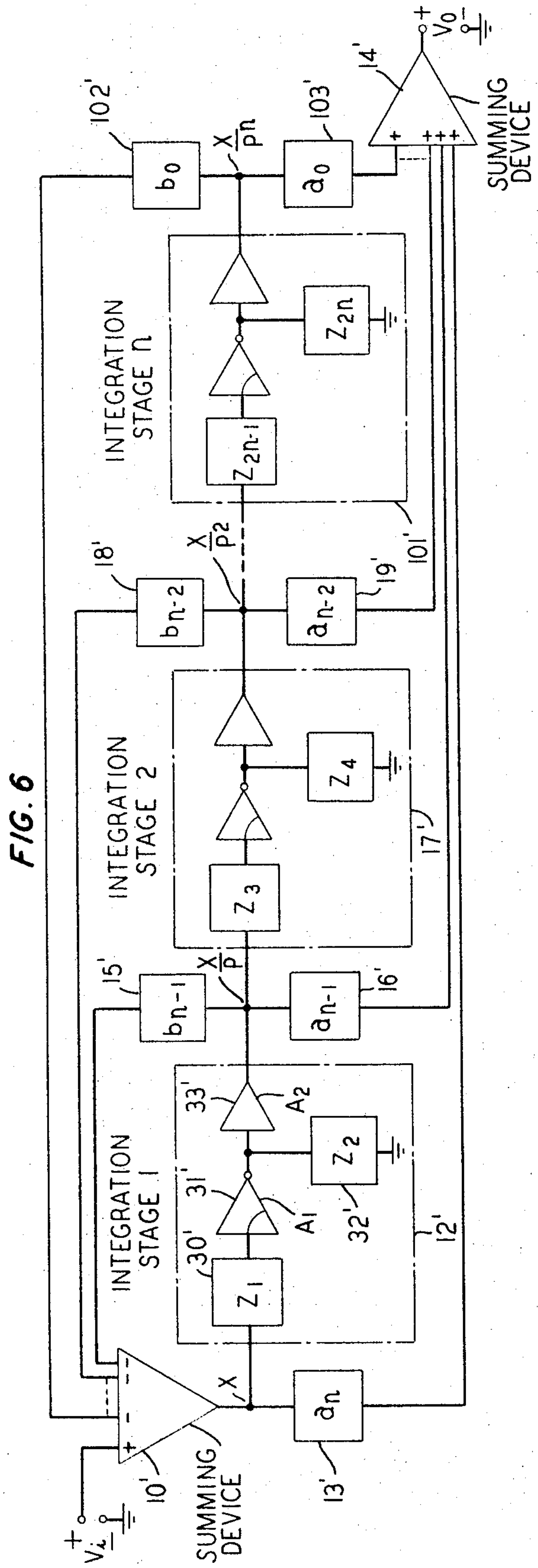
FIG. 6 is a block diagram of a generalized waveshaping network similar to that shown in FIG. 1 but, in accordance with the principles of the present invention, utilizing integrators comprising controlled sources.

FIG. 6 is a generalized block diagram of a frequency-shaping network utilizing integrators comprising controlled sources as the integration stages in the frequency-shaping network shown in FIG. 1. In particular, a block diagram of the integrator which serves as the building block in FIG. 6 is found in FIG. 3. In particular, those blocks in FIG. 6 having similar functions to those in FIG. 1 are labeled with primed numerals. Thus, for instance, integration stage in FIG. 1 designated 12 is designated 12′ in FIG. 6. A multiple input summing device 10′ supplies its output through coefficient determining impedance 13′ to output summing device 14′. In FIG. 6 the value of coefficient $b_n$ is unity and does not appear in the block diagram. The output of summing device 10′ is passed through a first integration stage 12', the output of which is supplied to a second integration stage 17', fed forward through coefficient determining impedance 16', and fed back through coefficient determining impedance 15'. Integration stage 1 comprises controlled sources and, in particular, the output of operative summing device 10' is supplied through impedance 30' (corresponding to block 30 of FIG. 3) to the input of current-controlled current source 31' and having a gain $A_1$. The output of current-controlled current source 31' is passed to ground through impedance 32' and passed through voltage-controlled voltage source 33' having a gain $A_2$. The output of summing device 10' is shown as $x$ and the output of the first integration stage is shown as $x/p$. The output of the first integration stage is passed through coefficient determining impedance element 16' to summing device 14' and fed back through coefficient determining impedance element 15' to one input of multiinput summing device 10'. Integration stage 1 and coefficient determining impedance elements 15' and 16' form the first stage of the frequency-shaping network. Two more stages are shown which represent a second integration stage with coefficient determining elements and an $n$th integration stage with coefficient determining elements. The description of the operation of each individual integration stage resembles that set forth for the operation of the integrator of FIG. 3 and the operation of the total frequency-shaping network has been set forth with respect to FIG. 1.

When the integrator of FIG. 3 is utilized as shown in FIG. 6, the transfer function which is produced is of the following form:

$$\frac{\sum_{k=0}^{n} a'_k}{\sum_{k=0}^{n} b'_k} \quad (5)$$

where $$a'_k = a_k d_k, \quad (6)$$

$$b'_k = b_k d_k,$$

and $$d_k = \prod_{j=1}^{n-k} \left( \frac{A_{2j-1} A_{2j} Z_{2j}}{Z_{2j-1}} \right). \quad (7)$$

It should be noted that this equation is similar to the equation (24) shown in page 205 in the book by Huelsman, but Huelsman normalizes the frequency of the transfer function therein. The advantages of the transfer function derived by utilizing the principles of the present invention may be seen by inspecting $d_k$ since the gain of the controlled source in the integrating stage is no more important in determining $d_k$ than the impedance elements in the integrating stage. In addition, $d_k$ is realized without the cancellation of relatively equally valued quantities and without requiring infinite gain as found in the prior art. This result for $d_k$ is without precedent in the prior art utilizing the frequency-shaping network of FIG. 1 or any known frequency-shaping network. The advantages of a frequency-shaping network arranged in accordance with the principles of the present invention may more clearly be seen by referring to the network for a biquadratic transfer function shown in FIG. 7.

Figure 7:
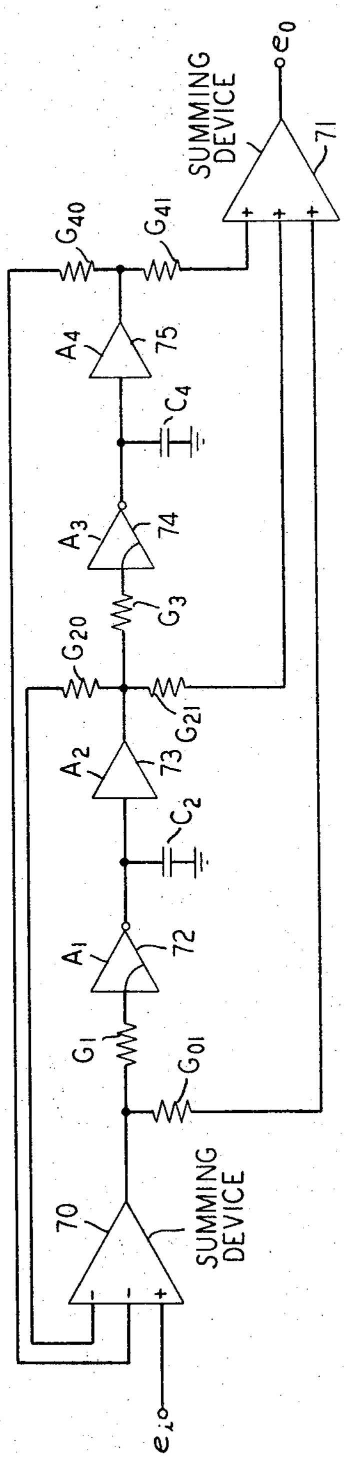
FIG. 7 is a schematic diagram of a frequency-shaping network formed by cascading two integrating stages and providing negative feedback between them which produces a biquadratic transfer function describing the operation of the network.

As seen in FIG. 7, two stages of the integration are required with feed forward and feedback associated with each stage. An input voltage is applied to one input of multiple input summing device 70 the output of which is applied to a first stage of integration and a first feed forward path. Conductance symbols are used to designate normally designated resistors in order to facilitate the presentation of the mathematics involved in the biquadratic transfer function associated with the frequency-selective network of FIG. 7. The operative summing device passes through conductance $G_{01}$ to one input of multiple input summing device 71. The output of summing device 70 also passes through conductance $G_1$ to the input of current-controlled current source 72 having gain $A_1$. The output of the current-controlled current source 72 passes to ground through integrating capacitor $C_2$ and also passes through voltage-controlled voltage source 73 having a gain as shown of $A_2$. At the output of the first stage of integration (the output of voltage-controlled voltage source 73), a feedback path is provided through conductance $G_{20}$ to one input of multiple input summing device 70. A feed forward path is provided from the output of voltage-controlled voltage source 73 through conductance $G_{21}$ to another input of multiple input summing device 71. The output of voltage-controlled voltage source 73 is also supplied through second stage of integration; thus, the output of voltage-controlled voltage source 73 is supplied through conductance $G_3$ to the input of current-controlled current source 74 having a gain $A_3$, as shown. The output of current-controlled current source 74 is supplied through integrating capacitor $C_4$ to ground and to the input of voltage-controlled voltage source 75 having a gain $A_4$ as shown. The output of voltage-controlled voltage source 75 is fed back through conductance $G_{40}$ to one input of multiple input summing device 70 and is fed forward through conductance $G_{41}$ to one input of multiple input summing device 71. Thus, the second stage of integration is provided by conductance $G_3$, current-controlled current source 74 and integrating capacitor $C_4$. The output of the frequency-shaping network shown in FIG. 7 is produced at the output of summing device 71.

The biquadratic transfer function which describes the frequency-shaping properties of the network shown in FIG. 7 is as follows:

$$\frac{G_{01}s^2 + G_{21}(A_1A_2G_1/C_2)\, s + G_{41}(A_3A_4G_3/C_4)}{s^2 + G_{20}(A_1A_2G_1/C_2)\, s + G_{40}(A_3A_4G_3/C_4)} \quad (8)$$

In particular, the second coefficient in the denominator which in the prior art was found to be sensitive to the gain of the amplifiers in the active devices (and was labeled $E$) may be shown to be insensitive to the gains of the active devices when they are connected in accordance with the principles of the present invention. Thus, the second term in the denominator which is a measure of the quality of the network and is also a measure of the selectivity of the frequency-shaping network is significantly better controlled than that obtainable in the prior art. In particular, it is desired that this value be as low as possible and also that it not vary markedly from its nominal value. In the prior art, due to the requirement of the cancellation or infinite gain, the desired maintenance of the nominal value was often difficult to obtain. In addition, from an inspection of equation (8), it may be seen that the coefficients of the transfer function may be controlled independently of each other while the active devices have relatively low gains.

As set forth above, the bandwidth obtainable by utilizing an integrator in accordance with the principles of the present invention is significantly greater than that obtainable in the prior art. In particular, the gains of the active elements may be relatively low. In actuality, these gains may be less than unity and when compared with the gains of the prior art active devices which often tend towards infinity in common engineering parlance (often greater than 1,000), the improvement in obtainable bandwidth is apparent. Clearly, the gain bandwidth product of the active devices limits the bandwidth which can be accommodated by such a high-gain device. A feature of the present invention is the ability to simultaneously utilize low gains in the active devices and maintain independence between the coefficients of the transfer functions which describe the operation of the frequency-selective network. Prior art frequency-shaping networks which utilize low-gain devices suffered from the inability to independently control the coefficients of the transfer function which describes its operation.

The integrating stages illustrated in the present application utilize resistive, capacitive, and active elements which may be fabricated by present-day integrated circuitry techniques. It is to be understood, of course, that when fabrication techniques can produce quality inductors, they may be used in an integration stage and arranged in accordance with the principles of the present invention in a frequency-shaping network. Of course, it is also to be understood that the generalized block diagram of FIG. 1 is shown with integrators because from engineering experience, it has been determined that cascading integrators provides significant benefit over cascading differentiators. But it is to be understood that the basic building block of the present invention could simulate a differentiating function by proper selection of impedances and could be utilized in a block diagram similar to FIG. 1 which included differentiating stages in lieu of the present integrating stages.

It is further to be understood that in the illustrative embodiment shown in the present invention ideal integration is performed. There are numerous instances in the prior art where lossy integration is preferred in a frequency-shaping network and it is to be understood that lossy integration may be obtained easily by proper selection of the impedances in the integrating block utilizing controlled sources. Further, more than one set of feed forward coefficient determining impedance elements and summing devices can be simultaneously used with FIG. 6 in order to derive transfer functions having different characteristics.

It is further to be understood that the embodiments of the present invention which have been described are merely illustrative of the application of the principles of the invention. Numerous modifications may readily be devised by those skilled in the art without departing from the spirit and scope of the invention.

I claim:

1. An active frequency-shaping network having a transfer function which is substantially insensitive to gain comprising:

- a first circuit arranged to provide first-order frequency-shaping, including at least a first current controlled current source;
- a second circuit arranged to provide first-order frequency-shaping, including at least a second current-controlled current source;
- means to apply an input voltage to said first circuit;
- means to apply the output of said first circuit to the input of said second circuit;
- and means to derive the output of said frequency-shaping network from the output of said second circuit.

2. Apparatus as set forth in claim 1 wherein said first and second circuits include a voltage-controlled voltage source connected after each current-controlled current source to provide isolation, thereby making the coefficients of said transfer function independently variable to a substantial degree.

3. Apparatus as set forth in claim 2 wherein at least one of said first and second circuits is arranged to perform an approximate integration function.

4. Apparatus as set forth in claim 3 wherein the gain of said current-controlled current sources is less than unity.

5. An active frequency-shaping network comprising:

- a first multiinput summing device;
- a second multiinput summing device;
- a first impedance means connected from the output of said first multiinput summing device to the input of said second multiinput summing device;
- means to apply an input voltage to one input of said first summing device;
- a first first-order frequency-shaping means connected to the output of said first summing device;
- a second first-order frequency-shaping means connected to the output of said first first-order frequency-shaping means;
- a second impedance means connected between the output of said first first-order frequency-shaping means and one input of said first multiinput summing device;
- a third impedance means connected between the output of said first first-order frequency-shaping means and one input of said second multiinput summing device;
- a fourth impedance means connected between the output of said second first-order frequency-shaping means and one input of said first multiinput summing means;
- a fifth impedance means connected between the output of said second first-order frequency-shaping means and one input of said second multiinput summing means;
- means to derive the output of said active frequency-shaping network at the output of said second multiinput summing device characterized in that said first and second first-order frequency-shaping means comprise controlled sources.

6. Apparatus as set forth in claim 5 wherein at least one of said first and second first-order frequency-shaping means comprises: a sixth impedance means connected to the input of a current-controlled current source and a seventh impedance means connected across the output of said current-controlled current source.

7. Apparatus as set forth in claim 6 wherein said sixth impedance means comprises a resistor and said seventh impedance means comprises a capacitor.

8. Apparatus as set forth in claim 6 wherein the gain of said current-controlled current sure is less than unity.

9. Apparatus as set forth in claim 6 wherein said current-controlled current source comprises at least one transistor connected in a common base mode of operation.

10. Apparatus as set forth in claim 6 wherein said first and second first-order frequency-shaping means are integrators.

11. Apparatus as set forth in claim 6 wherein the output of said current-controlled current source is applied to an isolating circuit comprising a voltage-controlled voltage source.

12. Apparatus as set forth in claim 11 wherein the gain of said voltage-controlled voltage source is less than unity.